(12) United States Patent
Ishikawa et al.

(10) Patent No.: US 7,441,520 B2
(45) Date of Patent: Oct. 28, 2008

(54) VALVE-TIMING CONTROL APPARATUS OF INTERNAL COMBUSTION ENGINE

(75) Inventors: Tsuyoshi Ishikawa, Kanagawa (JP); Kengo Kubo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 82 days.

(21) Appl. No.: 11/442,047

(22) Filed: May 26, 2006

(65) Prior Publication Data
US 2006/0266313 A1 Nov. 30, 2006

(30) Foreign Application Priority Data
May 30, 2005 (JP) ............................. 2005-156936

(51) Int. Cl.
*F01L 1/34* (2006.01)
(52) U.S. Cl. ............... 123/90.15; 123/90.17; 123/90.31
(58) Field of Classification Search .............. 123/90.15, 123/90.17, 90.31
See application file for complete search history.

(56) References Cited

U.S. PATENT DOCUMENTS

| 5,293,741 | A | * | 3/1994 | Kashiyama et al. | ........... 60/284 |
| 5,558,051 | A | * | 9/1996 | Yoshioka | .................. 123/90.15 |
| 2002/0043243 | A1 | * | 4/2002 | Majima | ...................... 123/399 |
| 2004/0139949 | A1 | * | 7/2004 | Koseki et al. | .......... 123/568.14 |

FOREIGN PATENT DOCUMENTS

JP 07-109934 4/1995

* cited by examiner

*Primary Examiner*—Zelalem Eshete
(74) *Attorney, Agent, or Firm*—Global IP Counselors, LLP

(57) ABSTRACT

A valve-timing control apparatus of an internal combustion engine provides a valve timing controller capable of continuously and variably controlling the overlap period of an intake valve and an exhaust valve of an internal combustion engine. A driving-state determination mechanism determines the driving state of the internal combustion engine and an overlap-period setting apparatus sets the overlap period with the valve timing controller. The overlap-period is set during the start of the internal combustion engine on the basis of the determinations of the driving-state determination mechanism which vary as the internal combustion engine starts.

16 Claims, 6 Drawing Sheets

VALVE-TIMING CONTROL APPARATUS OF INTERNAL COMBUSTION ENGINE

RELATED APPLICATION

The disclosure of Japanese Patent Application No. 2005-156936 filed on May 30, 2005, including the specification, claims, and drawings are incorporated herein by reference in its entirety.

FIELD

Disclosed herein is a control of an overlap period during which an intake valve and an exhaust valve are open (hereinafter, simply referred to as an overlap period), and more specifically, a control for improving exhaust performance during cold driving is disclosed. Internal combustion engines generally include a catalytic converter formed of a three way catalyst or the like in some point of an exhaust channel to reduce hydrocarbons, etc., in exhaust gas. The catalyst converters, however, cannot sufficiently purify the hydrocarbons, etc., until the catalyst converter reaches an activating temperature, so that the efficiency of purifying hydrocarbons, etc., is reduced during a cold start.

It is also known that when an overlap period is provided between an exhaust stroke and the subsequent intake stroke, part of high-temperature burned gas is blown back into the intake port to promote the vaporization of fuel that is adhered to the wall of the intake port to be liquefied, and unburned fuel that is taken off from the wall of the cylinder to be generated in a concentrated manner during the end of the exhaust stroke is blown back into the intake port without being exhausted, so that hydrocarbon emission is reduced.

Japanese Unexamined Patent Application Publication No. 7-109934 discloses a technique for improving exhaust performance during a cold start by increasing the overlap period during the cold start by using a valve-timing control mechanism capable of controlling the overlap period.

More specifically, the control mechanism checks to determine whether the combustion engine is in the cold start mode from the water temperature and the driving state directly after the engine is started, wherein when the control mechanism determines that the engine is in the cold start mode, the control mechanism switches the overlap period to a preset overlap period for the cold start which is longer than that for normal driving.

When the overlap period is increased, blown-back burned fuel increases, thereby decreasing the burning stability of the next cycle, and potentially increasing hydrocarbon emission. When cooling-water temperature increases, the temperature of the wall of the intake port also increases to thereby decrease the flow near the wall, so that the influence on the reduction of hydrocarbon emission by increasing the overlap period is reduced.

In the technique of Japanese Unexamined Patent Application Publication No. 7-109934, however, the overlap period during an engine start depends on whether the water temperature at the engine start is lower than a predetermine temperature, or whether the engine is in the cold start mode. Accordingly, the same overlap period is set for temperatures lower than the predetermined temperature irrespective of the cooling water temperature, so that an excessively long overlap period may be set to decrease burning performance.

SUMMARY

A valve-timing control apparatus of an internal combustion engine according to embodiments of the invention includes a valve timing controller capable of continuously and variably controlling the overlap period of an intake valve and an exhaust valve of an internal combustion engine. A driving-state determination mechanism determines the driving state of the internal combustion engine and an overlap-period setting apparatus sets the overlap period with the valve timing controller. The overlap-period setting apparatus sets the overlap period during the start of the internal combustion engine on the basis of the determinations of the driving-state determination mechanism which vary as the internal combustion engine starts. A method is also disclosed.

BRIEF DESCRIPTION OF THE DRAWINGS

Other features and advantages of the disclosed control system will be apparent from the ensuing description, taken in conjunction with the accompanying drawings, in which.

DETAILED DESCRIPTION

While the claims are not limited to the illustrated embodiments, and appreciation of various aspects of the control system is best gained through a discussion of various examples thereof.

Figure 1:
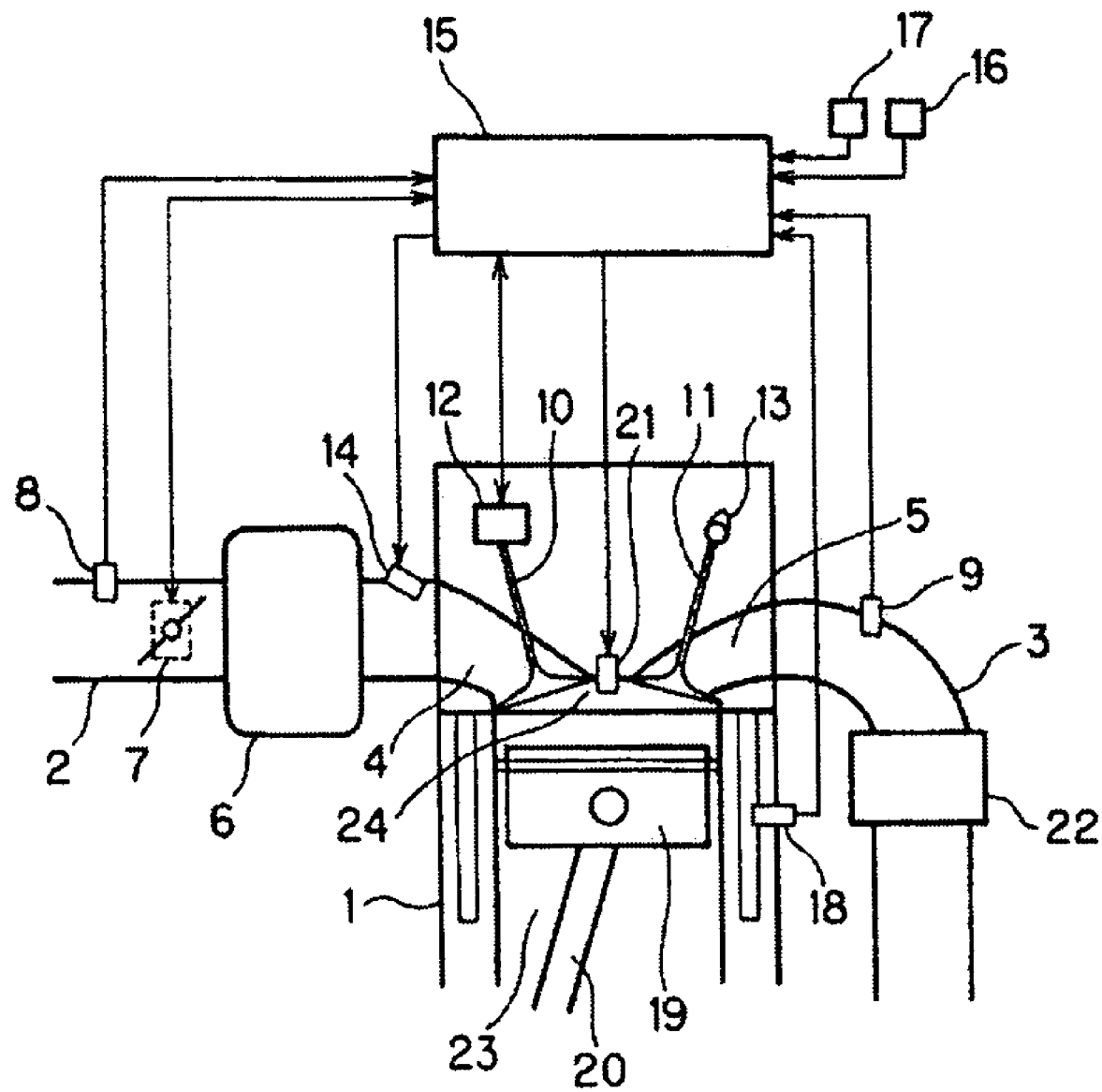
FIG. 1 is a schematic diagram of a system incorporating a first embodiment.

FIG. 1 is a schematic diagram of a system incorporating the embodiments. Reference numeral 1 denotes an engine, numeral 2 denotes an intake channel connected to an intake port 4 of the engine 1, and numeral 3 indicates an exhaust channel connected to an exhaust port 5 of the engine 1.

A piston 19 is slidably disposed in a cylinder 23 of the engine 1. The piston 19 connects to a crankshaft (not shown) via a connecting rod 20. An intake valve 10 and an exhaust valve 11 are provided at openings of the intake port 4 and the exhaust port 5 adjacent to the cylinder 23, respectively. The intake valve 10 and the exhaust valve 11 are opened and closed in association with sliding of the piston 19. The exhaust valve 11 is actuated by an exhaust camshaft 13 rotating with a crankshaft (not shown). The intake valve 10 is actuated by an intake camshaft (not shown) in a manner similar to the exhaust valve 11. The intake camshaft includes a valve-timing controller (hereinafter, referred to as a VTC) 12 for variably controlling the timing of opening and closing the intake valve 10, i.e., valve timing.

The VTC 12 may control at least the open timing of the intake valve 10, and uses a mechanism similar to known mechanisms such as a method for varying the relationship between the timing of opening and closing the intake valve and the angle of the crankshaft by rotating a cam pulley (not shown) provided at the end of the intake camshaft (not shown)

to route a timing chain or the like. Hereinafter, the rotation angle at which the cam pulley is rotated around the intake camshaft from the initial state of the VTC 12 is referred to as "a twist angle". The twist angle is set large in the direction in which the open timing of the intake valve 10 is advanced, and set small in the direction in which the open timing is retarded. In other words, the twist angle is set large to increase the overlap period.

A spark plug 21 for sparking the fuel air mixture in the cylinder 23 is opposed to a combustion chamber 24.

The intake channel 2 has an air flow meter 8 for measuring the amount of intake air, a throttle valve 7 for controlling the amount of intake air, a collector tank 6 for distributing the intake air into the cylinders of the engine 1, and a fuel injection valve 14 for injecting fuel toward the intake port 4 in sequence from the upper stream. Although the throttle valve 7 of this embodiment is what is called a computerized throttle whose opening and closing are controlled electronically, the invention is not so limited.

The exhaust channel 3 has an air-fuel ratio sensor 9 for measuring the air fuel ratio of exhaust gas and an exhaust-gas purifying catalyst 22 for purifying exhaust gas in sequence from an upper stream.

The measurements of the air flow meter 8 and the air-fuel ratio sensor 9 are read by a control unit 15. The control unit 15 also reads signals sensed and measured by a water temperature sensor 18 for measuring the temperature of cooling water as a driving-state determination mechanism, an accelerator position sensor 16 for detecting the position of an accelerator, and a crank angle sensor 17 that measures the crank angle for measuring the RPM of the engine 1. The control unit 15 calculates a required intake air amount, a target air-fuel ratio, etc. from the signals to thereby control the opening of the throttle valve 7 and a fuel injection quantity, to control the timing of ignition as an ignition-timing setting apparatus, and to set an overlap period and control the valve timing, to be described later, as an overlap-period setting apparatus.

Figure 2:
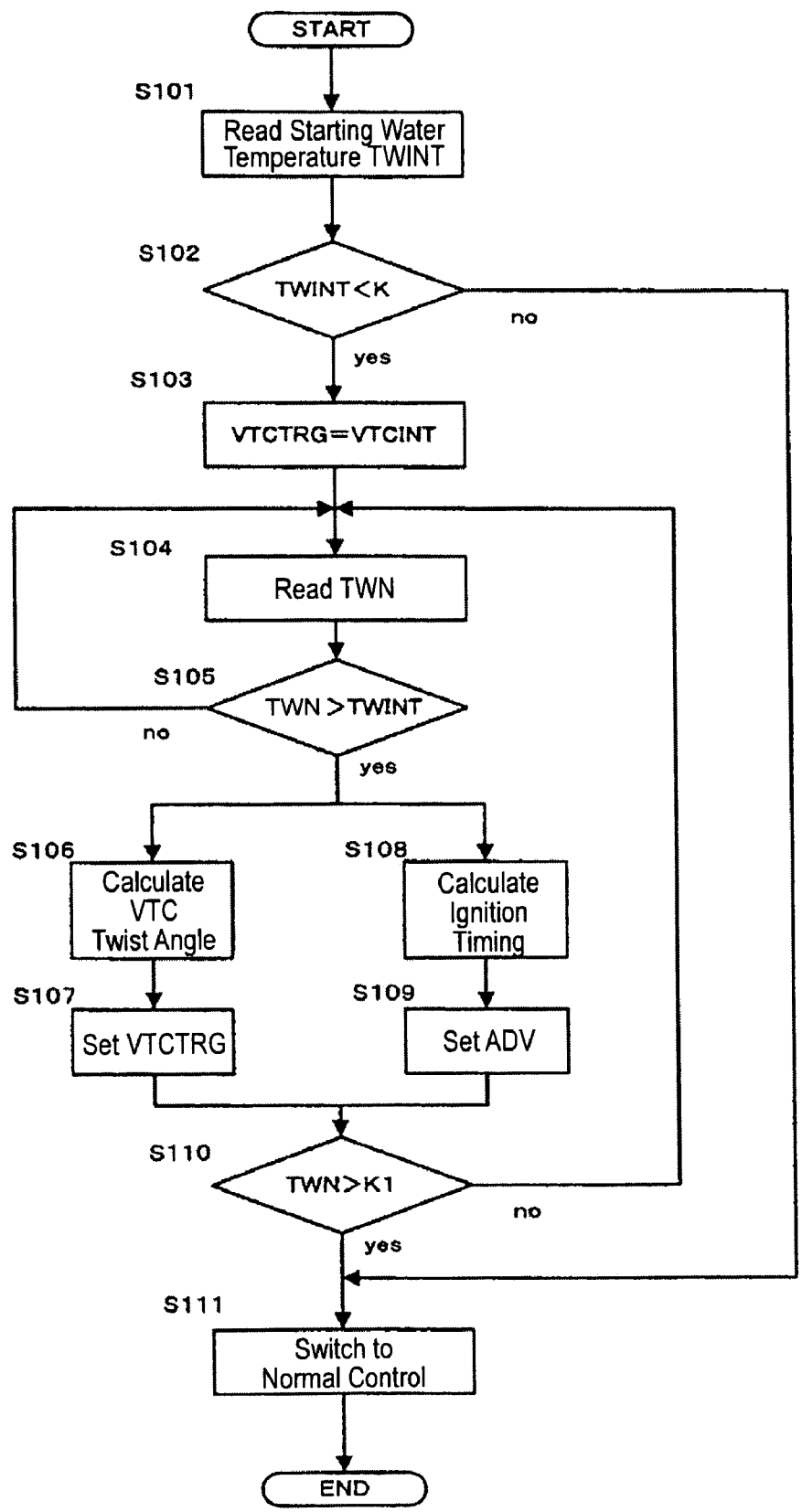
FIG. 2 is a diagram showing a control routine of the first embodiment.

Referring next to FIG. 2, the control of valve timing and ignition timing will be described. FIG. 2 illustrates a routine for controlling valve timing and ignition timing performed by the control unit 15. The control routine will be described in the order of steps.

In step S101, the control unit 15 reads a cooling-water temperature TWINT at the starting of the engine 1 from the signal of the water temperature sensor 18.

In step S102, the control unit 15 checks to determine whether the detected cooling-water temperature TWINT is lower than a predetermined temperature K.

When the cooling-water temperature TWINT is higher than the predetermined temperature K, the process proceeds to step S111. When the cooling water temperature TWINT is lower than the predetermined temperature K, the process proceeds to step S103, where a target VTC position is set as the initial value of a VTC twist angle. The predetermined temperature K is a preset temperature for determining if the engine 1 is in a cold start mode.

The target VTC position VTCTRG is a VTC twist angle for enabling the intake valve 10 to open at a target crankshaft angle which is set by map searching or the like in response to the starting cooling-water temperature TWINT.

The lower the cooling-water temperature TWINT, the larger the target VTC twist angle VTCTRG is set. This is because the lower the cooling water, the larger the effect of promoting fuel evaporation by the exhaust gas blown back into the intake port 4, as described above, is.

The initial VTC position VTCINT indicates the initial position of the VTC 12, or a state in which the twist angle is zero. For the predetermined temperature K, a temperature almost equal to a temperature at which warming up end is set.

In step S104, the present cooling-water temperature TWN is read.

In step S105, the control unit 15 checks to determine whether the read cooling-water temperature TWN is higher than the starting cooling-water temperature TWINT, or whether the cooling water temperature is increasing. When the present cooling-water temperature TWN is higher, the process proceeds to step S106 and step S107; otherwise the process returns to step S104.

Figure 3:
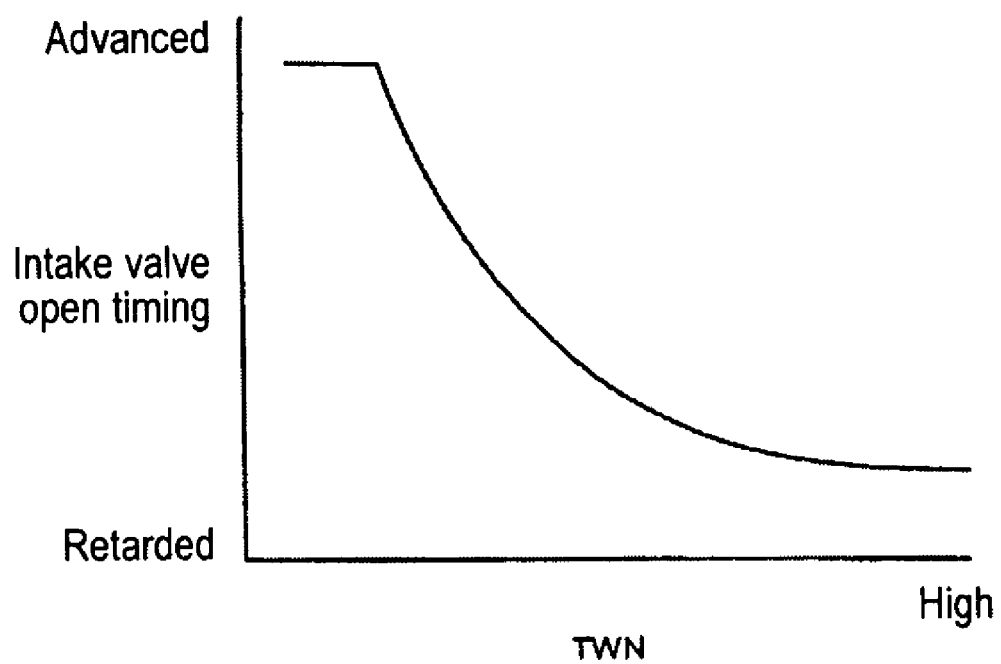
FIG. 3 is a graph showing the relationship between intake-valve open timing and cooling-water temperature.

In step S106, a twist angle VTC is calculated. Specifically, as shown in FIG. 3, the relationship between cooling water temperatures and twist angles is mapped, which is searched for the cooling-water temperature TWN read in step S104.

The map shows that the twist angle is large when the cooling-water temperature TWN is low, and decreases gradually with an increase in temperature beyond a predetermined temperature. This is for the following reasons.

The lower the cooling water temperature, the lower the temperature of the wall surface of the intake port 4 is. Accordingly, port-wall flow tends to be generated, thus decreasing the fuel flowing into the cylinder 23 in comparison with the injection from the fuel injection valve 14. Thus, the fuel injection is corrected to increase during cold start so that a necessary amount of fuel flows into the cylinder 23 also when port-wall flow is generated. However, there are heavy fuels and light fuels. Accordingly, when light fuel is used in the case where a weight-gain correction value is set with reference to heavy fuel, the port-wall flow becomes less than that of heavy fuel, so that more fuel flows into the cylinder 23 to make the fuel air ratio in the cylinder 23 excessively rich. In contrast, when heavy fuel is used in the case where a weight-gain correction value is set with reference to light fuel, the fuel air ratio in the cylinder 23 becomes excessively lean. The weight gain correction value is therefore set with reference to heavy fuel so that a necessary amount of fuel flows into the cylinder 23. In contrast, when light fuel is used, unburned hydrocarbon emission has increased.

When the overlap period is increased, exhaust gas is blown back into the intake port 4 to promote the vaporization of the fuel in the intake port 4, thus decreasing the difference in port-wall flow between heavy fuel and light fuel. Briefly, the weight-gain correction value of fuel injection during startup can be decreased, so that unburned hydrocarbon emission can be reduced. The evaporation of fuel is thus promoted by increasing overlap period at low temperatures at which port-wall flow is liable to occur.

On the other hand, when cooling-water temperature increases, the temperatures of the wall surface of the intake port 4 and the intake valve 10 also increase, thus facilitating evaporation of fuel in the intake port 4. This reduces the effects of the promotion of the evaporation of fuel by the backward flow of exhaust gas. Accordingly, in this embodiment, the overlap period is decreased gradually with an increase in cooling-water temperature.

Returning to the control routine shown in FIG. 2, in step S107, the twist angle calculated in step S106 is set as a target VTC position VTCTRG.

Figure 4:
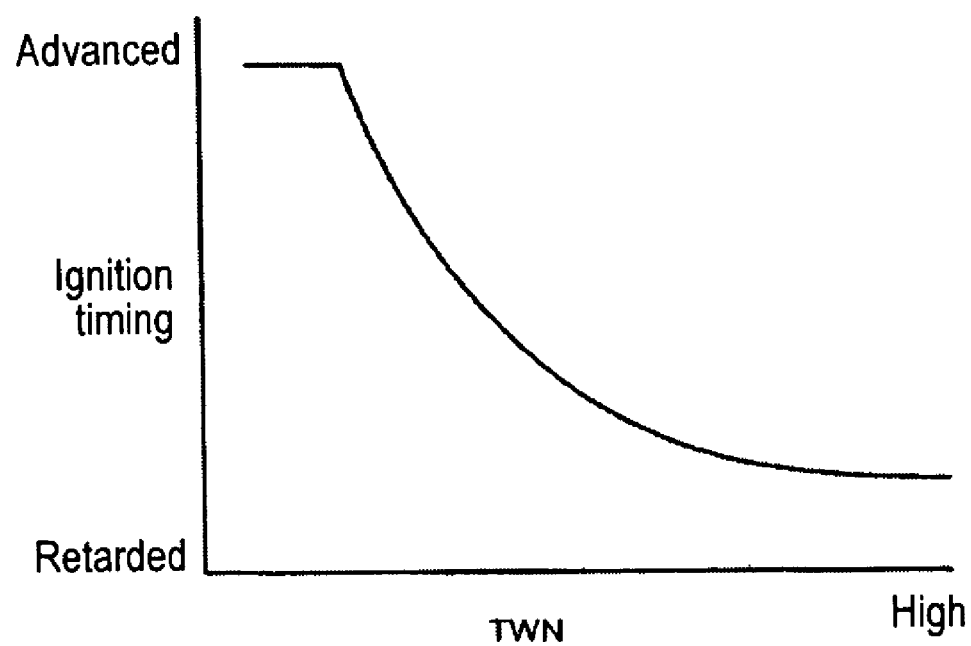
FIG. 4 is a graph showing the relationship between ignition timing and cooling-water temperature.

In step S108, ignition timing is calculated. Specifically, the relationship between cooling-water temperature TWN and ignition timing is mapped, as shown in FIG. 4, and ignition timing is found by searching the map. The map is set in such a manner that the lower the cooling-water temperature TWN, the more the ignition timing is advanced. This is for the following reasons.

When the VTC twist angle is increased to increase the overlap period, exhaust gas is blown back into the intake port 4, as described above. The blown back exhaust gas flows into the cylinder 23 in the next cycle. Accordingly, the longer the overlap period, the more the proportion of residual gas in the cylinder 23 is, thus reducing burning stability. Thus the ignition timing must be advanced to maintain the limit of stability of burning. However, when the ignition timing is advanced, the exhaust temperature decreases to reduce the efficiency of conversion of the exhaust-gas purifying catalyst 22, thus increasing hydrocarbon emission (hereinafter, referred to as tail-pipe hydrocarbon emission) to the exterior of the vehicle. Thus, at low temperatures at which burning stability is low, the ignition timing is advanced to thereby ensure burning stability; at high temperatures at which burning stability is high, the ignition timing is retarded gradually to thereby increase exhaust temperature, thus improving the efficiency of conversion of the exhaust-gas purifying catalyst 22.

Returning again to the control routine in FIG. 2, in step S109, the ignition timing calculated in step S108 is set as target ignition timing ADV.

After a target twist angle VTGTRG and target ignition timing ADV have been set in steps S107 and S109, the process proceeds to step S110, wherein it is determined whether the cooling-water temperature TWN has reached a predetermined temperature K1. The predetermined temperature K1 is set to a temperature at which engine warming up is regarded as having been completed.

When the cooling-water temperature TWN is lower than the predetermined temperature K1, the process returns to step S104, and the steps S104 to S109 are repeated. When the cooling-water temperature TWN has reached the predetermined temperature K1, the process proceeds to step S111, wherein the control of the twist angle and the ignition timing is switched to a control mode for normal driving.

As described above, when it is determined that the engine 1 is in cold start mode, a VTC twist angle for cold start and an ignition timing responsive to the VTC twist angle are set. The VTC twist angle is gradually decreased as the cooling-water temperature increases, with which the ignition timing is also retarded gradually. The exhaust temperature is increased by the retard of the ignition timing, so that the exhaust-gas purifying catalyst 22 can be activated early. Upon completion of the warming up, the process is switched to normal control.

The advantages of the control according to the embodiment will be described with reference to FIG. 5, which is a time chart for the cooling-water temperature, overlap period, ignition timing, and exhaust temperature.

Figure 5:
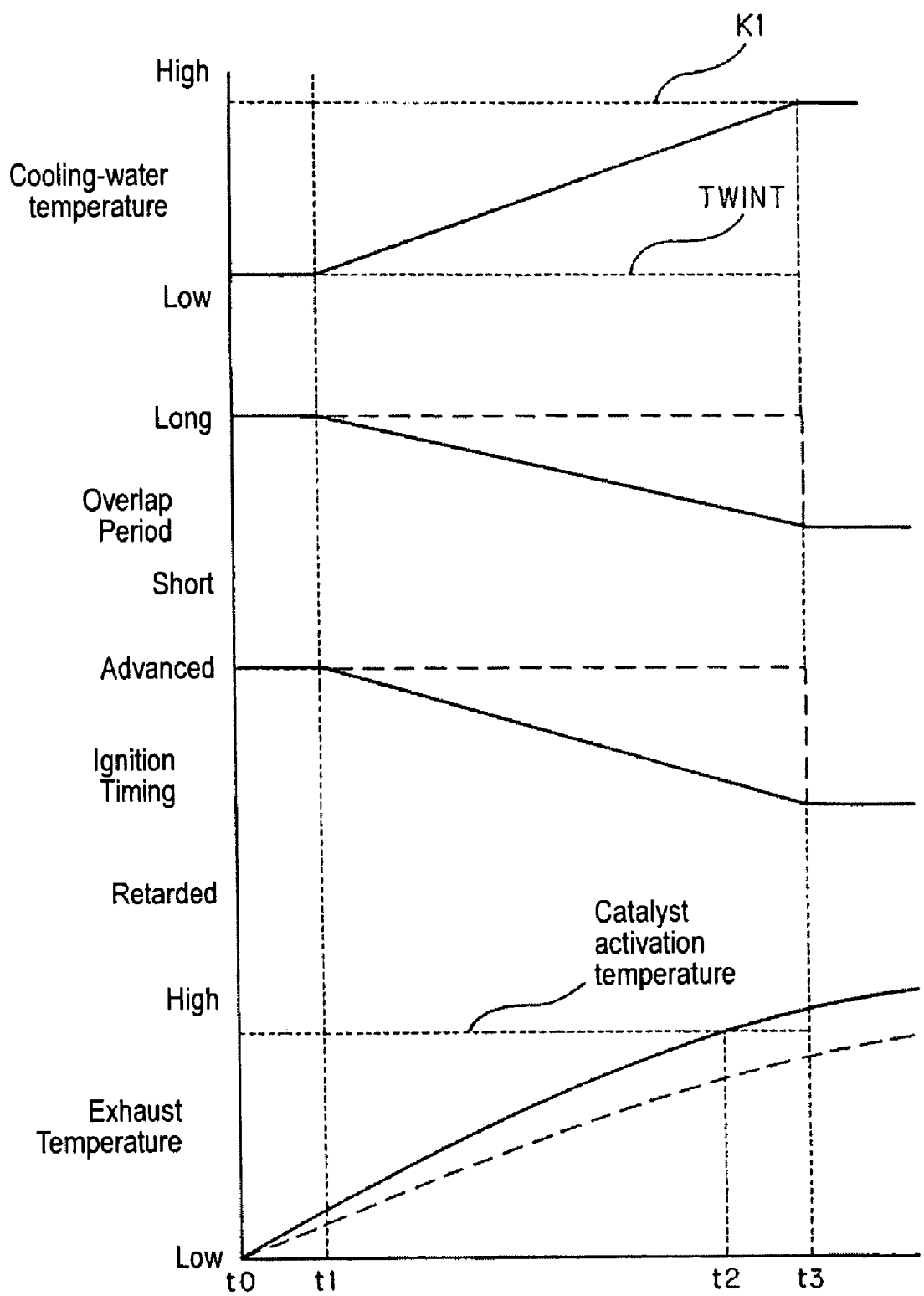
FIG. 5 is a time chart for executing the first embodiment.

Referring to FIG. 5, the solid lines graphically illustrate the control of the embodiment, while the broken lines graphically illustrate a control in which the overlap period and ignition timing set at engine starting are maintained until the end of warming up, as in the related art.

The engine 1 is started at t0, and the initial value of the overlap period (VTC twist angle) is set on the basis of the cooling-water temperature TWINT at that time. The lower the cooling-water temperature, the higher the initial value is set.

Thereafter, when the cooling-water temperature starts to increase at t1, the overlap period is decreased gradually and the ignition timing is retarded gradually. When the cooling-water temperature reaches the predetermined temperature K1, so that warming up ends at t3, then the process is switched to the control for normal driving.

Since the overlap period and the ignition timing are varied with the cooling-water temperature in this manner, the temperature of the exhaust-gas purifying catalyst 22 rises faster than that by the control of the related art, so that the temperature of the exhaust-gas purifying catalyst 22 reaches an activation temperature at t2 before the end of the warming up. Thus tail-pipe hydrocarbon emission can be reduced more than that by the control of the related art.

This embodiment therefore offers the following advantages.

The VTC 12 is capable of variably controlling the overlap period of the intake valve 10 and the exhaust valve 11 of the engine 1, the water temperature sensor 18 for measuring the cooling-water temperature of the engine 1, and the control unit 15 for setting the overlap period. The control unit 15 sets the overlap period at the start of the engine 1 on the basis of the cooling-water temperature at the start of the engine 1, so that an overlap period suitable for the condition of the engine 1 can be set. This prevents the overlap period from increasing unnecessarily to reduce burning performance while promoting the evaporation of fuel due to the backward flow of high-temperature burned gas into the intake port 4 at the end of the discharge stroke and reducing hydrocarbon emission due to the backward flow of the hydrocarbons generated at the end of the discharge stroke. As a result, the hydrocarbon emission at the start of the engine 1 can be reduced.

Since the setting of the overlap period based on the cooling-water temperature is repeated after the start of the engine 1 to the end of the warming up, an appropriate overlap period depending on an increase in cooling-water temperature can be set, so that burning stability can be ensured.

Since the overlap period is set longer as the cooling-water temperature is lower, the backward flow of high-temperature burned gas increases as the temperatures of the wall surface of the intake port 4 and the intake valve 10 are lower, in which wall flow is likely to occur, thus promoting the evaporation of fuel.

Since ignition timing is controlled on the basis of the cooling-water temperature at cold start, the reduction of burning performance can be prevented even when the overlap period is increased.

Since the setting of ignition timing based on the cooling-water temperature is repeated until the end of the warming up of the engine 1, appropriate ignition timing according to an increase in cooling-water temperature can be set. This configuration can increase exhaust temperature by retarding ignition timing while ensuring burning performance to activate the exhaust-gas purifying catalyst 22 early.

Further, the overlap period during engine starting is set on the basis of the driving state at engine starting, e.g., the temperatures of the cooling water and the intake valve. By using the driving state the need for setting unnecessarily long overlap time is eliminated, thereby reducing hydrocarbon emission while preventing a decrease in burning performance.

A second embodiment will now be described. The arrangement of this embodiment is similar to that of FIG. 1, except for the control of ignition timing at cold start.

Figure 6:
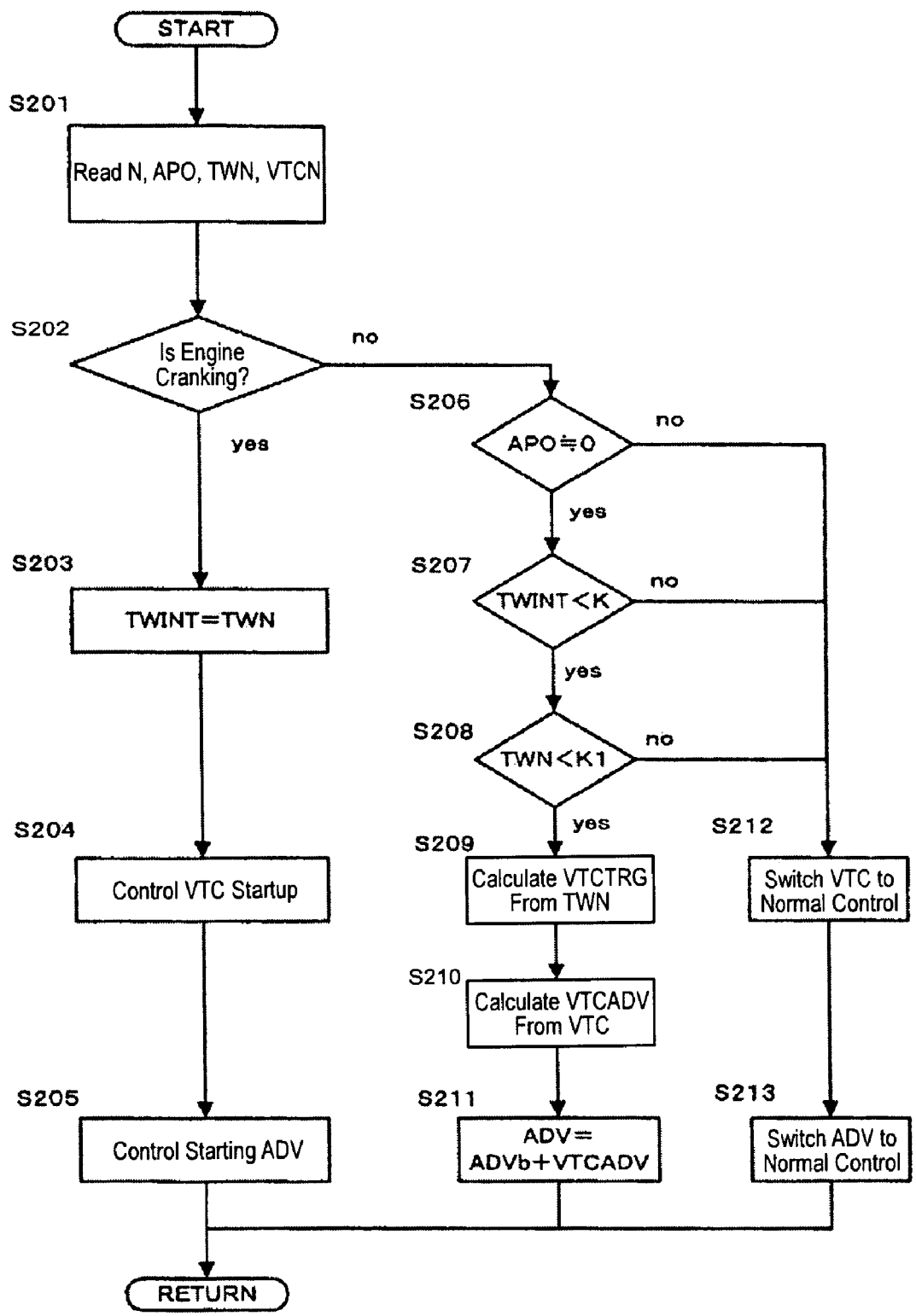
FIG. 6 is a diagram showing a control routine of a second embodiment.

Referring to FIG. 6, the control of the VTC twist angle and ignition timing of this embodiment will be described. FIG. 6 shows a control routine of this embodiment, which is different from that of the first embodiment in that the change of the ignition timing is set on the basis of an actual VTC twist angle (which is measured by a sensor). The control routine will be described in the order of steps.

In step S201, engine RPM N, accelerator position APO, cooling-water temperature TWN, and VTC twist angle VTCN (which is measured by a sensor) are read.

In step S202, it is determined whether the engine 1 is cranking. When it is determined that the engine 1 is cranking, the process proceeds to step S203; when it is not, the process proceeds to step S206.

In step S203, the cooling-water temperature TWN read in step S201 is set as a starting cooling-water temperature TWINT.

In step S204, the VTC twist angle for starting the engine 1 is controlled. Specifically, a target VTC twist angle is set to the initial state of the VTC 12, for example, a minimum retard angle VTCmin.

In step S205, the ignition timing for starting is controlled. Specifically, ignition timing ADV suitable for starting the engine 1 is calculated from the engine RPM N and the cooling-water temperature TWN.

When it is determined in step S202 that the engine 1 is not cranking, or is autonomously rotating, it is determined in step S206 whether the accelerator position APO is at zero. When the accelerator position is at approximately zero, the process proceeds to step S207; when it is not approximately zero, the process proceeds to step S212. When an idle switch that is turned on during idling is provided in addition to the accelerator position sensor, the determination may be made on the basis of the condition of the idle switch.

In step S207, it is determined whether the starting cooling-water temperature TWINT is lower than the predetermined temperature K. The predetermined temperature K is a temperature for determining whether the engine 1 is in cold start mode, as in the first embodiment. The predetermined temperature K is set in advance.

When the starting cooling-water temperature TWINT is lower than the predetermined temperature K, the process proceeds to step S208. When it is not, the process proceeds to step S212.

In step S208, it is determined whether the cooling-water temperature TWN read in step S201 is lower than a predetermined temperature K1. The predetermined temperature K1 is set to a temperature close to the predetermined temperature K and higher than the predetermined temperature K. When it is determined that the cooling-water temperature TWN is lower than the predetermined temperature K1, the process moves forward to step S209; when it is not, the process proceeds to step S212.

In step S209, a target VTC twist angle VTCTRG is set on the basis of the cooling-water temperature TWN. Specifically, a map in which target VTC twist angle VTCTRG is plotted against cooling-water temperature TWN, which is also used in the first embodiment as shown in FIG. 3, is produced in advance. This map is searched for the cooling-water temperature TWN read in step S201 to thereby find a target VTC twist angle VTCTRG.

Figure 7:
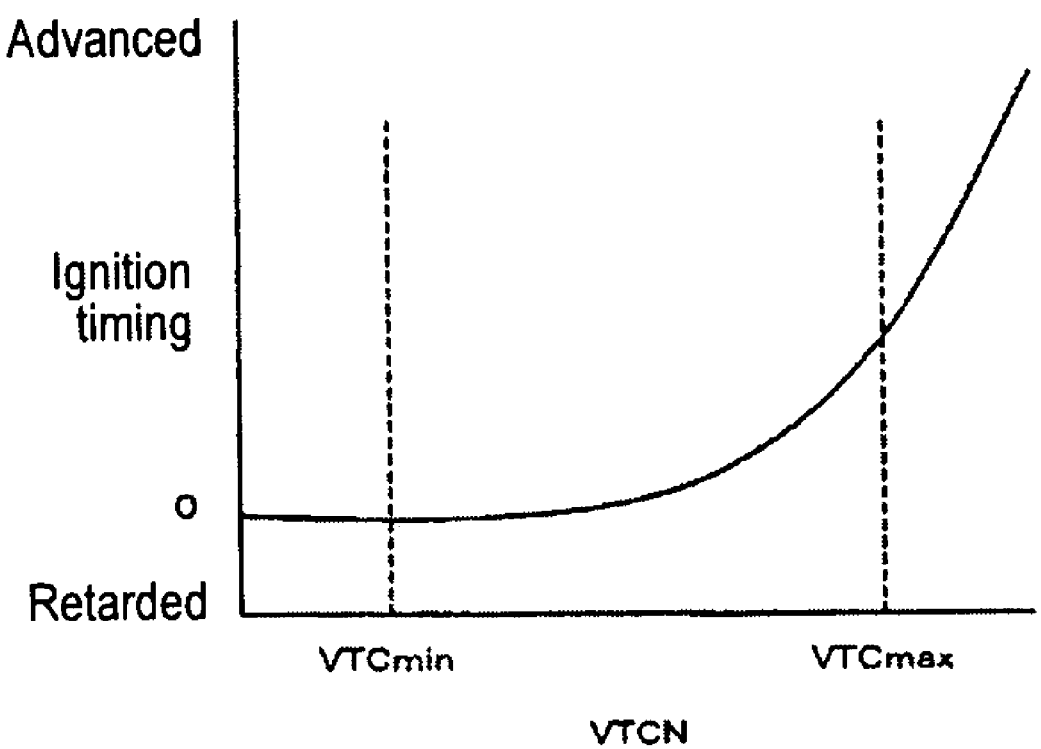
FIG. 7 is a graph showing the relationship between ignition-timing correction values and valve timing controller twist angles.

In step S210, an ignition-timing correction value VTCADV is calculated from the present VTC twist angle VTCN. Specifically, a map in which ignition-timing correction is plotted against VTC twist angle VTCN is produced in advance. This map is searched for the present VTC twist angle to thereby find an ignition-timing correction value VTCADV. The map used herein is set in such a manner that the ignition-timing correction value VTCADV increases as the VTC twist angle increases, as shown in FIG. 7. This is because the overlap period increases with increase in the VTC twist angle to thereby increase the residual gas in the cylinder 23, reducing burning stability, so that the ignition timing needs to be advanced to ensure burning stability.

In step S211, ignition timing ADV is set using the ignition-timing correction value VTCADV obtained in step S210 and an ignition-timing basic value ADVb for cold start. Specifically, it is calculated by eq. (1).

$$ADV = ADVb + VTCADV \tag{1}$$

The ignition-timing basic value ADVb indicates ignition timing at which exhaust temperature can be maximized while burning stability is maintained with the VTC 12 at the initial value. For example, it is set on the basis of the engine RPM N and the cooling-water temperature TWN.

In step S212, the control of the VTC 12 is switched to that for normal driving. Specifically, the control for normal driving is a control in which a map on which a target VTC twist angle is set depending on the driving state of the engine 1, e.g., the engine RPM and engine load is produced in advance, and this map is searched for the present driving state.

In step S213, the control of the ignition timing ADV is switched to that for normal driving. Specifically, the control for normal driving is a control in which a map on which ignition timing is set depending on the driving state of the engine 1, e.g., the engine RPM and engine load, is produced in advance, and this map is searched for the present driving state, like the map for controlling the VTC 12. The ignition timing ADV on the control map is ignition timing at which the output fuel efficiency is maximized while sufficient burning stability is provided.

The ignition-timing correction value VTCADV is set on the basis of the present VTC twist angle VTCN, and the ignition timing is corrected on the basis of the correction value, as in steps S210 to S211. This configuration enables appropriate ignition timing to be set even if the control of the VTC 12 is delayed.

For example, when the VTC 12 is hydraulically operated, an instruction signal is sent to the hydraulic control mechanism of the VTC 12 so as to achieve the target VTC twist angle calculated in the present control routine, and an ignition signal is sent according to the ignition timing ADV. However, with the engine 1 in cold driving, the viscosity of the hydraulic oil is so high that the control response speed of the VTC 12 is low, so that the time after the target VTC twist angle VTCTRG is set until the actual VTC twist angle reaches the target value may be increased. In this case, when the ignition timing ADV is set, e.g., on the basis of the target VTC twist angle VTCTRG, independently from the present VTC twist angle VTCN, the ignition timing is excessively advanced or retarded from the actual overlap period. Actually, a control response delay for the case of changing the VTC twist angle with increase in cooling-water temperature can be almost ignored. However, long control response delay may be developed when the VTC twist angle is set to an angle according to the cooling-water temperature from the initial state directly after the start of control.

When ignition timing appropriate for the actual overlap period has not been set, the control response delay may pose the problems that an increase in exhaust temperature delays and no burning stability can be provided.

However, when the ignition timing is corrected on the basis of the present VTC twist angle, the burning stability reduced by increasing the VTC twist angle, i.e., the overlap period can be corrected by minimum ignition timing correction.

With the configuration of this embodiment, the ignition timing is corrected on the basis of the present VTC twist angle. Thus, in addition to the advantages of the first embodiment, appropriate ignition timing can be set even if the control response of the VTC 12 delays, thereby providing sufficient burning stability.

The temperature of the intake valve 10 may be calculated from a measured cooling-water temperature with reference to the relationship between the cooling-water temperature and the temperature of the intake valve 10 which is obtained in advance, and the temperature of the intake valve 10 may be used in place of the cooling-water temperature TWINT.

When the overlap period and the ignition timing are changed in the first and second embodiments, the output of the engine 1 changes. The changes, however, can be offset by the control of throttle position by idling feedback control executed during idling.

It is to be understood that the invention is not limited to above-described embodiments but various modifications can be made within the technical spirit and scope of the claims.

What is claimed is:

1. A valve-timing control apparatus of an internal combustion engine, comprising:
    a valve timing controller that continuously and variably controls an overlap period of an intake valve and an exhaust valve of an internal combustion engine;
    driving-state determination means for determining a driving state of the internal combustion engine;
    overlap-period setting means for setting the overlap period with the valve timing controller, with the overlap-period setting means setting the overlap period during a start of the internal combustion engine based on determinations of the driving-state determination means which vary as the internal combustion engine starts, such that the overlap period increases as a temperature of an engine cooling fluid decreases; and
    ignition-timing setting means for setting an ignition timing of the internal combustion engine based on the determinations of the driving-state determination means, with the ignition-timing setting means setting the ignition timing during a cold start of the internal combustion engine based on the determinations of the driving-state determination means at the engine startup, such that the ignition timing is advanced as the valve overlap period increases.

2. The valve-timing control apparatus according to claim 1, wherein
    the overlap-period setting means further includes a function of repeatedly updating the overlap period using the determinations of the driving-state determination means as parameters at predetermined intervals after the internal combustion engine starts until warming up of the internal combustion engine is achieved.

3. The valve-timing control apparatus according to claim 1, wherein
    the driving-state determination means further includes a function of measuring cooling-water temperature as the driving state.

4. The valve-timing control apparatus according to claim 1, wherein
    the driving-state determination means further includes a function of measuring temperature of the intake valve as the driving state.

5. The valve-timing control apparatus according to claim 4, wherein
    the overlap-period setting means further includes a function of setting the overlap period longer as the temperature of the intake valve is lower.

6. The valve-timing control apparatus according to claim 1, wherein
    the ignition-timing setting means further includes a function of repeatedly updating the setting of the ignition timing based on the determinations of the driving-state determination means at predetermined intervals until warming up of the internal combustion engine is achieved.

7. The valve-timing control apparatus according to claim 1, further comprising:
    means for measuring an actual overlap period; and
    ignition-timing setting means for setting the ignition timing of the internal combustion engine based on the actual overlap period.

8. A valve-timing control apparatus of an internal combustion engine, comprising:
    a valve timing controller that continuously and variably controls an overlap period of an intake valve and an exhaust valve of an internal combustion engine;
    a driving-state determination mechanism that determines a driving state of the internal combustion engine;
    an overlap-period setting apparatus that sets the overlap period with the valve timing controller, with the overlap-period setting apparatus setting the overlap period during a start of the internal combustion engine based on determinations of the driving-state determination mechanism which vary as the internal combustion engine starts, such that the overlap period increases as a temperature of an engine cooling fluid decreases; and
    an ignition-timing setting apparatus that sets an ignition timing of the internal combustion engine based on the determination of the driving-state determination mechanism, with the ignition-timing setting apparatus setting the ignition tuning during a cold start of the internal combustion engine based on determinations of the driving-state determination mechanism at the engine startup, such that the ignition timing is advanced as the valve overlap period increases.

9. The valve-timing control apparatus according to claim 8, wherein
    the overlap-period setting apparatus repeatedly updates the overlap period using the determinations of the driving-state determination mechanism as parameters at predetermined intervals after the internal combustion engine starts until warming up of the internal combustion engine is achieved.

10. The valve-timing control apparatus according to claim 8, wherein
    the driving-state determination mechanism measures cooling-water temperature as the driving state.

11. The valve-timing control apparatus according to claim 8, wherein
    the driving-state determination mechanism measures temperature of the intake valve as the driving state.

12. The valve-timing control apparatus according to claim 11, wherein
    the overlap-period setting apparatus sets the overlap period longer as the temperature of the intake valve is lower.

13. The valve-timing control apparatus according to claim 8, wherein
    the ignition-timing setting apparatus repeatedly updates the setting of the ignition timing based on the determinations of the driving-state determination mechanism at predetermined intervals until warming up of the internal combustion engine ends.

14. The valve-timing control apparatus according to claim 8, further comprising:
    a mechanism that measures an actual overlap period; and
    an ignition-timing setting apparatus for setting the ignition timing of the internal combustion engine based on the actual overlap period.

15. A method for controlling valve timing of an internal combustion engine comprising:
   determining a driving state of the internal combustion engine;
   continuously and variably setting an overlap period of an intake valve and an exhaust valve of the internal combustion engine on based on determination of the driving state which varies as the internal combustion engine starts, with the valve overlap period varying in inverse proportion to a temperature of the engine; and
   setting an ignition timing during a cold start of the internal combustion engine based on the driving-state at the engine startup such that the ignition timing is advanced as the valve overlap period increases.

16. The method according to claim 15, wherein
   the driving-state determination mechanism uses one of cooling-water temperature and intake valve temperature as the driving state that is determined.

* * * * *